US012225366B2

(12) United States Patent
Soronen et al.

(10) Patent No.: US 12,225,366 B2
(45) Date of Patent: Feb. 11, 2025

(54) ACOUSTIC TRANSDUCER WITH BALANCED PROPERTIES

(71) Applicant: PS Audio Design Oy, Oulu (FI)

(72) Inventors: Petri Soronen, Oulu (FI); Vesa Kajanus, Oulu (FI); Petteri Luukkanen, Oulu (FI); Mikko Mäkelä, Oulu (FI); Eero Yli-Rantala, Oulu (FI)

(73) Assignee: PS Audio Design Oy, Oulu (FI)

(*) Notice: Subject to any disclaimer, the term of this patent is extended or adjusted under 35 U.S.C. 154(b) by 0 days.

(21) Appl. No.: 17/907,097

(22) PCT Filed: Dec. 29, 2020

(86) PCT No.: PCT/FI2020/050872
§ 371 (c)(1),
(2) Date: Sep. 22, 2022

(87) PCT Pub. No.: WO2021/191492
PCT Pub. Date: Sep. 30, 2021

(65) Prior Publication Data

US 2024/0223959 A1 Jul. 4, 2024

(30) Foreign Application Priority Data

Mar. 25, 2020 (FI) .................................... 20205298

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/028* (2013.01); *H04R 9/025* (2013.01); *H04R 9/045* (2013.01);
(Continued)

(58) Field of Classification Search
None
See application file for complete search history.

(56) References Cited

U.S. PATENT DOCUMENTS 4,517,514 A 5/1985 Howell
5,905,805 A * 5/1999 Hansen .................... H04R 9/06 381/431

(Continued)

FOREIGN PATENT DOCUMENTS

EP 3603110 9/2020
WO 1995022234 8/1995

(Continued)

OTHER PUBLICATIONS

"FI Application No. 20205298 Search Report", Nov. 4, 2020, 2 pages.

(Continued)

*Primary Examiner* — James K Mooney
(74) *Attorney, Agent, or Firm* — DeLizio, Peacock, Lewin & Guerra LLP

(57) ABSTRACT

Acoustic transducer comprises an upper part (301) and a lower part (302), with a first permanent magnet (303) in the upper part (301) and a second permanent magnet (304) in the lower part (302). Similarly named magnetic poles of the first and second permanent magnets (303, 304) face each other. An upper cover (306) in the upper part (301) and a lower cover (307) in the lower part (302) comprise magnetic material and define an enclosure around the magnets (303, 304). A coil (308) creates, under influence of an electric current, dynamic magnetic forces. A separating gap (309) between edges of said upper cover (306) and lower cover (307) is directed so that it allows a relative movement of the edges of said lower cover (307) and said upper cover (306)
(Continued)

between different positions, said positions differing in the extent to which edges coincide.

20 Claims, 6 Drawing Sheets

(51) Int. Cl.
*H04R 9/02* (2006.01)
*H04R 9/04* (2006.01)

(52) U.S. Cl.
CPC ...... *H04R 2400/11* (2013.01); *H04R 2499/15* (2013.01)

(56) References Cited

U.S. PATENT DOCUMENTS

| | | | |
|---|---|---|---|
| 2010/0329486 A1 | 12/2010 | Scheel et al. | |
| 2017/0311085 A1 | 10/2017 | Daley et al. | |
| 2021/0226520 A1* | 7/2021 | Maenpaa | G06F 3/016 |

FOREIGN PATENT DOCUMENTS

| | | |
|---|---|---|
| WO | 2019081805 | 5/2019 |
| WO | 2019238204 | 12/2019 |
| WO | 2020001787 | 1/2020 |
| WO | 2021191492 | 9/2021 |

OTHER PUBLICATIONS

"PCT Application No. PCT/FI2020/050872 International Search Report", Sep. 30, 2021, 5 pages.

* cited by examiner

ACOUSTIC TRANSDUCER WITH BALANCED PROPERTIES

FIELD OF THE INVENTION

The invention is generally related to the field of acoustic transducers that convert electric signals into mechanical vibrations, preferably on acoustic frequencies. The invention is particularly related to acoustic transducers that can be used to make one or more surfaces of an electric device act as part (s) of the conversion.

BACKGROUND OF THE INVENTION

FIG. 1 illustrates a known acoustic transducer as such, without attachment to an electronic device, in a partially cut-out axonometric view. FIG. 2 illustrates a cross section of the same known acoustic transducer along the same plane at which the cut-out is made in FIG. 1, with a schematically shown attachment to an electronic device. An acoustic transducer of this kind is known for example from the patent application document EP3603110 A1.

The known acoustic transducer of FIGS. 1 and 2 comprises an upper part 101 and a lower part 102 separated from each other by a horizontal gap 103. The upper part is attached, at its top surface, to a first structural part 201 of an electronic device. The first structural part 201 is typically a visible or at least accessible part of the electronic device, for example its display panel. Its top surface 202 is visible or at least accessible to a user, so that the top surface 202 constitutes an interface to the surrounding air. The lower part 102 of the acoustic transducer is attached, at its bottom surface, to a second structural part 203 of the electronic device. The second structural part 203 may be for example part of a structural support frame of the electronic device. The structural relation of the first and second structural parts 201 and 203 serves to maintain the horizontal gap 103 between the upper and lower parts 101 and 102. The gap 103 may also be filled with elastic, non-magnetic material that may form an adhesion joint between the upper and lower parts 101 and 102.

A first permanent magnet 104 is located in the upper part 101, and a second permanent magnet 105 is located in the lower part 102. In the embodiment shown in FIGS. 1 and 2 the first permanent magnet 104 has the shape of a relatively flat cylinder, and the second permanent magnet 105 has the form of a relatively flat ring. The magnetic poles of the first and second permanent magnets 104 and 105 are oriented in a repelling configuration, so that their similarly named poles (either S poles or N poles) face each other. Thus the static magnetic force resulting from the mutually facing similarly named magnetic poles constantly pushes the upper and lower parts 101 and 102 away from each other.

The acoustic transducer comprises an upper cover 106 and a lower cover 107, both of which are cup-formed and made of magnetic material. The magnetic property of the upper and lower covers 106 and 107 concentrates and guides the magnetic field lines of the first and second permanent magnets 104 and 105 so that as a result, an attracting static magnetic force appears at the edges of the horizontal gap 103.

A coil 108 surrounds the second permanent magnet 105 in the lower part 102. A flat cable 109 provides an electrically conductive connection from an electronic circuit (not shown) located somewhere else in the electronic device to the coil 108. A varying electric current flowing through the coil 108 induces a dynamic magnetic field that sums up with the static magnetic fields explained above, making the upper part 101 move vertically with respect to the lower part 102. The structural stiffness of the first structural part 201 is weaker than that of the second structural part 203, so the electromagnetically induced vertical movements of the upper part 101 are converted into oscillating modes of the first structural part 201, which in turn make the first structural part 201 emit audible sounds into the surrounding air. In short, the acoustic transducer makes the first structural part 201 work like a planar loudspeaker.

An inherent drawback of the known acoustic transducer of FIGS. 1 and 2 is related to the deli-cate balance of the repelling and attracting static magnetic forces. In particular, the relative strength of the attracting magnetic force is strongly dependent on the distance between the edges of the upper and lower covers 106 and 107 at the gap 103. If an external force pushes the first structural part 201 downwards, for example when a user inadvertently presses a touch panel slightly too hard with a fingertip, the gap 103 may temporarily close altogether. This may cause the upper and lower parts 101 and 102 to snap together under the influence of the increased attracting magnetic force, which may be so strong that this becomes a permanent condition and the transducer malfunctions.

A second drawback of the known acoustic transducer of FIGS. 1 and 2 is that if the gap between the upper and lower parts is to consist only of air, it is difficult to manufacture the transducer in one integral piece that could be assembled separately and delivered to the manufacturer of the electronic device. Typically the upper and lower parts of the acoustic transducer are delivered, and it remains on the responsibility of the device manufacturer to place and attach them accurately enough in the first and second structural parts of the electronic device.

A technical solution would be welcome that could make an acoustic transducer less susceptible to malfunctioning in the way described above and that could be manufactured in an integral piece if needed.

SUMMARY

It is an objective to provide an acoustic transducer and an arrangement for producing acoustic signals without the drawbacks of prior art that were described above.

According to a first aspect there is provided an acoustic transducer for converting electric signals into mechanical vibrations on acoustic frequencies. The acoustic transducer comprises an upper part and a lower part. A first permanent magnet is located in the upper part and a second permanent magnet is located in the lower part. Similarly named magnetic poles of the first and second permanent magnets face each other in the direction of an axis line. The acoustic transducer comprises an upper cover in the upper part and a lower cover in the lower part. Said upper and lower covers comprise magnetic material, and together they define an enclosure around the first and second permanent magnets. At least one coil is located in said enclosure and configured to create, under influence of an electric current flowing through said coil, dynamic magnetic forces in the direction of said axis line. A separating gap between edges of said upper cover and lower cover is directed essentially in the direction of said axis line, allowing a relative movement of the edges of said lower cover and said upper cover in the direction of said axis line between different positions, said positions differing in the extent to which said edges of said upper cover and lower cover coincide in the direction perpendicular to said axis line.

According to an embodiment said upper cover has a U-formed cross section, with said first permanent magnet located inside the loop of the U. Said lower cover has a plate-formed cross section, with an outer edge of the plate defining said edge of the lower cover. Said second permanent magnet is on that side of the plate that faces the inside of the U-formed cross section of the upper cover. This involves the advantage that the appropriately directed gap between the edges of the upper and lower covers can be realized with a number of different construction approaches.

According to an embodiment said lower cover has a U-formed cross section, with said second permanent magnet located inside the loop of the U. Said upper cover has a plate-formed cross section, with an outer edge of the plate defining said edge of the upper cover. Said first permanent magnet is on that side of the plate that faces the inside of the U-formed cross section of the lower cover. This involves the advantage that the appropriately directed gap between the edges of the upper and lower covers can be realized with a number of different construction approaches.

According to an embodiment, in said U-formed cross section, ends of the arms of the U comprise inwards protruding extensions. Inner extremities of said extensions define said edge of the respective cover. This involves the advantage that the effects relating to the magnetic field lines crossing the gap can be made more prominent.

According to an embodiment said upper or lower cover comprises a first cup part and a second cup part, each having a skirt portion and an end portion. Said second cup part may be in an inverted position with respect to the first cup part. Said skirt portions of said first and second cup parts may be at least partially inside each other, and the end portion of said second cup part has an opening, the edge of which defines said edge of the respective cover. This involves the advantage that a clearly defined, extending edge of the respective cover can be manufactured with a variety of detailed approaches.

According to an embodiment said skirt portions of said first and second cup parts are inside each other for a majority of the length of the skirt portions of both said first and said second cup parts. The permanent magnet may be inside the skirt portions of both said first and said second cup parts. This involves the advantage that a significant total wall thickness can be obtained for the respective cover.

According to an embodiment the length of the skirt portion of said first cup part is larger than the length of the skirt portion of said second cup part. The permanent magnet may be inside the skirt portion of said first cup part, and said first permanent magnet and said second cup part may be stacked inside the skirt portion of said first cup part. This involves the advantage that the permanent magnet can be attached to the first cup part before attaching the second cup part.

According to an embodiment the upper or lower part comprises a sheet of magnetic material stacked between the permanent magnet and the end portion of the first cup part. This involves the advantage of added thickness of magnetic material in the respective part of the structure.

According to an embodiment said upper or lower cover comprises a first cup part and a second cup part each having a skirt portion and an end portion. Said second cup part may be in a similarly oriented position with respect to the first cup part and inside said first cup part. The skirt portion of said second cup part may comprise a perforated zone of said skirt portion at an intermediate longitudinal level of said skirt portion. The skirt portion of said second cup part may comprise a solid zone at its end opposite to the end portion, which solid zone defines said edge of the respective cover. This involves the advantage that metal working on the respective part can be finished before adding the first permanent magnet.

According to an embodiment said upper or lower cover comprises a first cup part having a skirt portion closed at one end by an end portion and open at the other end. The respective cover may comprise a washer part with an outer rim and an inner rim, of which said inner rim defines an opening that is smaller than the inner dimension of said skirt portion. Said washer part may be attached to the open end of the skirt portion, concentrically with said first cup part, so that the inner rim of the washer part defines said edge of the respective cover. This involves the advantage that a very accurately dimensioned edge of the upper part can be produced.

According to an embodiment the acoustic transducer comprises a support member configured to resist relative movement of said upper and lower parts in directions perpendicular to said axis line while simultaneously allowing relative movement of said upper and lower parts in the direction of said axis line. This involves the advantage that the dimensions of the gap can be maintained very accurately.

According to an embodiment said support member comprises a multibranch spiral spring, with a center portion of said multibranch spiral spring attached to one of the upper and lower parts and extremities of said multibranch spiral spring attached to the other part. This involves the advantage that the support member is relatively easy to manufacture and attach to the rest of the acoustic transducer construction.

According to an embodiment said support member comprises a foil attached to said upper and lower parts and bridging said separating gap. This involves the advantage that a very thin support member can be used, reducing the overall height of the acoustic transducer.

According to an embodiment at least a part of said foil constitutes a flexible printed circuit for conducting electric signals to said at least one coil. This involves the advantage that a structural part can be used for double purposes, reducing the overall number of parts in the acoustic transducer construction.

According to a second aspect there is provided an arrangement for producing sound. The arrangement comprises an electronic device with first and second structural parts, and at least one acoustic transducer of a kind described above. The upper part of the acoustic transducer is attached to said first structural part and the lower part of the acoustic transducer attached to said second structural part of the electronic device. As a part of the electronic device an electric circuit is configured to feed electric signals into said at least one coil of the acoustic transducer.

According to an embodiment said first structural part comprises a visible outer surface of said electronic device, such as a display of said electronic device. This involves the advantage that a separate loudspeaker can be omitted, making another structural part of the electronic device double as an emitter of sound.

According to an embodiment said second structural part comprises a part of a structural support frame of the electronic device. This involves the advantage that it is relatively easy to provide enough structural stiffness to support the lower part of the acoustic transducer.

According to an embodiment the upper part of the acoustic transducer has a first lateral dimension on that side at which the upper part is attached to the first structural part. The arrangement may comprise an essentially non-elastic first attachment member between said upper part and said first structural part for conveying movements of said upper part in the direction of said axis line into said first structural part. Said first attachment member may have a second lateral dimension that is smaller than said first lateral dimension. This involves the advantage that a smaller portion of the first structural part of the electronic device needs to remain stiff.

According to an embodiment the arrangement comprises an essentially elastic second attachment member between those portions of said upper part and said first structural part that are not covered by said first attachment part, for stabilizing said upper part against tilting with respect to said first structural part. This involves the advantage that the attachment of the acoustic transducer can be stabilized without weakening its capability to convey oscillations into the first structural part of the electronic device.

According to an embodiment said second attachment member comprises elastically deformable cushioning material and/or spring branches extending further on said first structural part than said first lateral dimension of the upper part. This involves the advantage of implementing the desired supporting features with a variety of implementation possibilities.

According to an embodiment the arrangement comprises a support sheet between said upper part and said first structural part for matching local elastic properties of the first structural part to movements conveyed thereto by the upper part. This involves the advantage of better matching local elastic properties of the first structural part to movements conveyed thereto by the upper part.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 3:
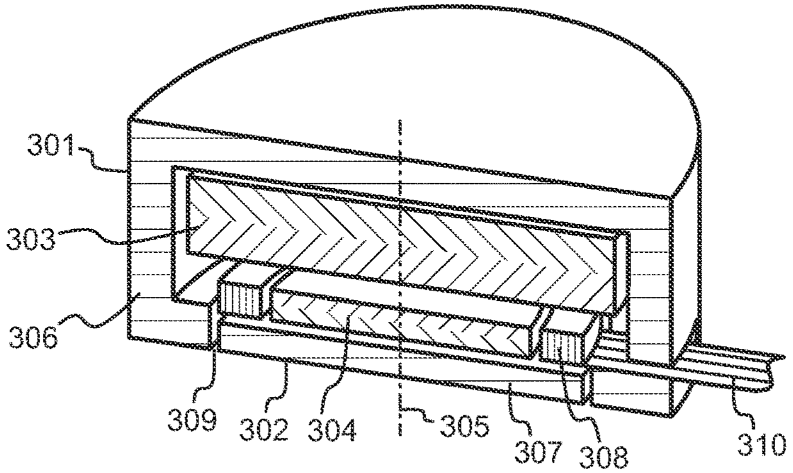
FIG. 3 illustrates an acoustic transducer according to an embodiment.
Figure 4:
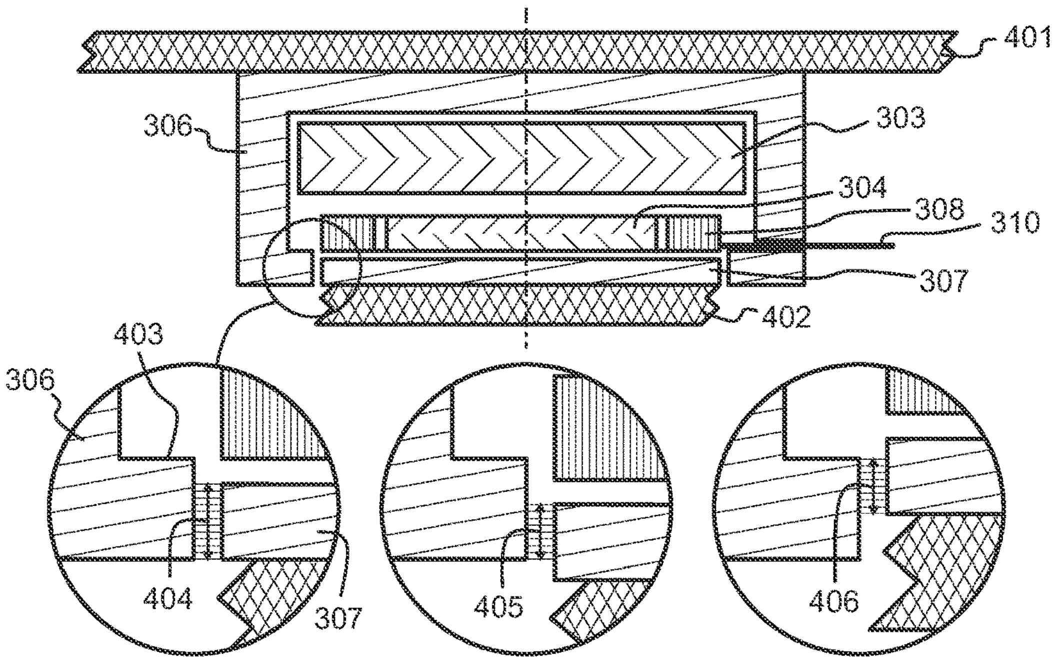
FIG. 4 illustrates an acoustic transducer according to an embodiment.

FIG. 3 illustrates an acoustic transducer according to an embodiment in a partially cut-out axonometric view. FIG. 4 illustrates a cross section of the same acoustic transducer along the same plane at which the cut-out is made in FIG. 3, with a schematically shown attachment to an electronic device.

The acoustic transducer comprises an upper part 301 and a lower part 302. Here, and also in all other parts of this text, direction-related terms such as “upper” or “lower” are only used as illustrative names that facilitate easier comparison to the drawings. Such terms are not to be construed as limiting the applicability or use of the corresponding parts or features in any particular direction in any practical implementation of the described embodiments. Another important generalization is that even if many of the embodiments shown in the drawings exhibit rotational symmetry and have the general form of a round cylinder, this is only to make the drawings easier to read. The round cylindrical form is by no means limiting, and most of the shown structures could well have other forms such as triangular, rectangular, hexagonal, or other polygonal forms. This applies in particular to the general outline of the acoustic transducer, and the consequent general outlines of the cover parts, permanent magnets, and coils.

General roles of the upper and lower parts 301 and 302 in an arrangement for producing sound are shown schematically in FIG. 4. It is assumed that an electronic device comprises a first structural part 401 and a second structural part 402. The upper part 301 of the acoustic transducer is attached to the first structural part 401 and the lower part 302 of the acoustic transducer is attached to the second structural part 402 of the electronic device.

A first permanent magnet 303 is located in the upper part 301 and a second permanent magnet 304 is located in the lower part 302. Polarities of the first and second permanent magnets 303 and 304 are graphically illustrated with the oblique hatch in the drawings. Similarly named magnetic poles of the first and second permanent magnets 303 and 304 face each other in the direction of the axis line 305, which axis line also indicates the direction that gives rise to the designations “upper” and “lower”. Similarly named poles mean the N or S poles, so that either the S pole of the first permanent magnet 303 faces the S pole of the second permanent magnet 304, or the N pole of the first permanent magnet 303 faces the N pole of the second permanent magnet 304. As a result, the basic static magnetic interaction between the first and second permanent magnets 303 and 304 is a repelling force in the direction of the axis line 305.

The acoustic transducer comprises an upper cover part 306 in the upper part 301 and a lower cover part 307 in the lower part 302. The upper and lower covers 306 and 307 comprise magnetic material, with the most important consequence that the upper and lower covers 306 and 307 are capable of confining a significant proportion of the magnetic field lines of the first and second permanent magnets 303 and 304 within their material. Together, the upper and lower covers 306 and 307 define an enclosure around the first and second permanent magnets 303 and 304.

At least one coil 308 is located in said enclosure. In this embodiment the coil 308 is generally ring-shaped and placed around the second permanent magnet 304 in the same plane as the second permanent magnet 304. In other words, the axis line 305 represents also a central axis of the coil 308. Other possibilities for placing the coil within the enclosure formed by the upper cover 306 and lower cover 307 exist and will be described in more detail later in this text. The coil 308 is configured to create, under influence of an electric current flowing through it, dynamic magnetic forces in the direction of the axis line 305. In an arrangement for producing sound the electronic device comprises an electric circuit configured to feed electric signals (i.e. electric currents of varying form and magnitude) into the coil 308 of the acoustic transducer.

The acoustic transducer comprises a separating gap 309 between edges of the upper cover 306 and the lower cover 307. The separating gap 309 is directed essentially in the direction of the axis line 305. This is a significant difference to the previously known acoustic transducer in FIGS. 1 and 2, where the separating gap was essentially perpendicular to the central vertical axis of the structure. As shown in the partial enlargements at the lower part of FIG. 4, the separating gap 309 allows a relative movement of the edges of the lower cover 307 and the upper cover 306 in the direction of the axis line 305 between different positions. These positions differ from each other in the extent to which the edges of the upper cover 306 and the lower cover 307 coincide in the direction perpendicular to the axis line 305. For example, in the leftmost partial enlargement in FIG. 4 the edges of the upper cover 306 and lower cover 307 coincide to the extent shown by arrow 404, while in the central and rightmost partial enlargements they coincide to the extent shown by arrows 404 and 405 respectively.

Figure 5:
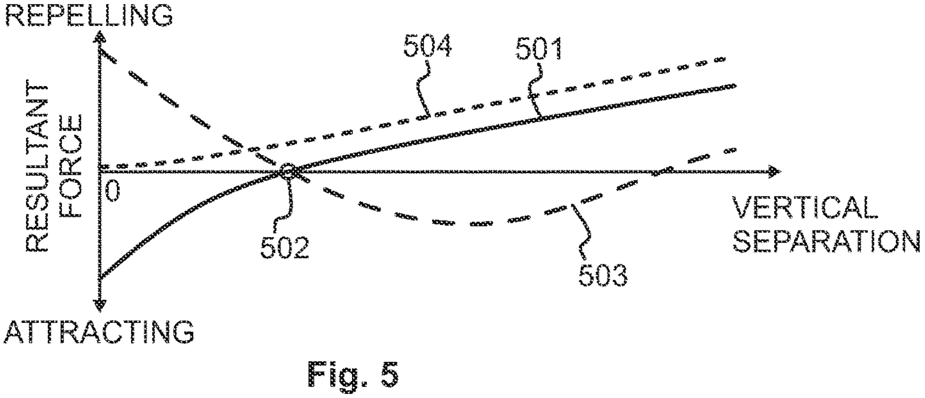
FIG. 5 illustrates the resultant static magnetic force as a function of vertical movement in various structures.

FIG. 5 illustrates a comparison of the resultant static magnetic force in three example structures of an acoustic transducer. The horizontal axis represents vertical separation of upper and lower parts of the transducer, and the vertical axis shows qualitatively whether the resultant static magnetic force is repelling or attracting. The resultant static magnetic force is the vector sum of the attracting and repelling static magnetic force components, and for simplicity it is considered in the vertical direction only. The attracting static magnetic force component arises essentially from that part of the magnetic field the field lines of which are confined to the magnetic material of the upper and lower covers 106 and 107. The repelling static magnetic force component arises essentially from that part of the magnetic field the field lines of which occupy the free space between the similarly named magnetic poles that face each other in the middle of the acoustic transducer structure.

Figure 1:
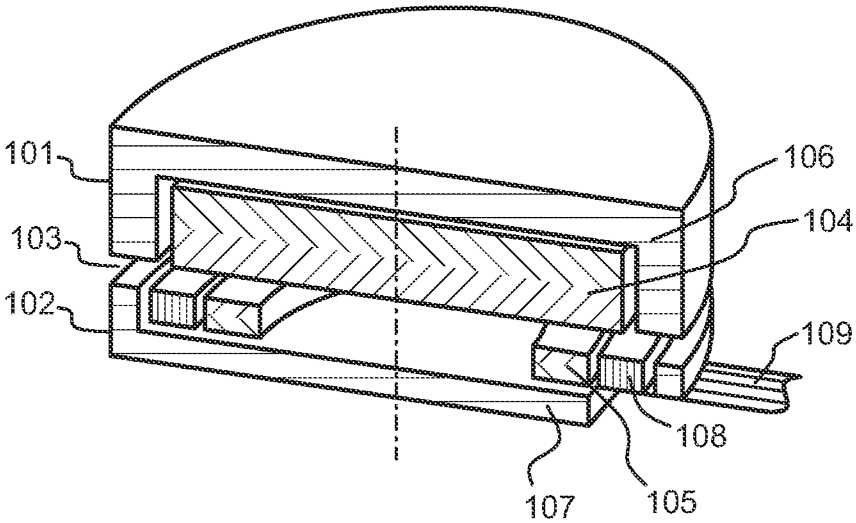
Fig. 1 PRIOR ART
FIG. 1 illustrates a known acoustic transducer.
Figure 2:
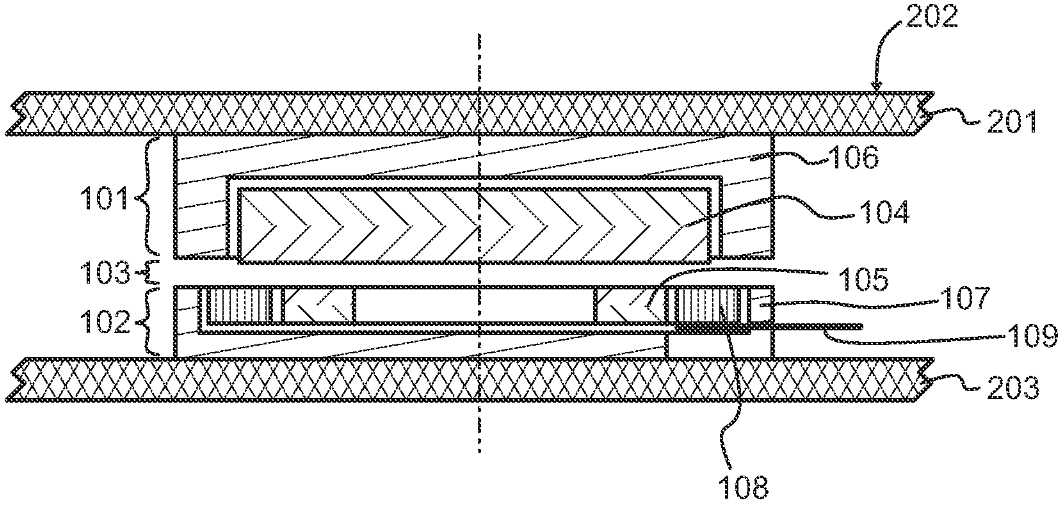
Fig. 2 PRIOR ART
FIG. 2 illustrates a known acoustic transducer.

Graph 501, which is shown as the solid line in FIG. 5, corresponds to the previously known acoustic transducer shown in FIGS. 1 and 2 and described above in the background section. In such a structure the zero point of vertical separation (i.e. the zero point of the horizontal axis) is where the edges of the upper and lower covers 106 and 107 snap against each other, i.e. the gap 103 closes altogether. There is a nominal design point 502 at which the resultant static magnetic force is zero. As shown in FIG. 5, in the whole range between the nominal design point 502 and the zero point the resultant static magnetic force represented by graph 501 is attracting. This results from the attracting static magnetic force component prevailing over the repelling static magnetic force component at small vertical separations in the known structure. The attracting resultant static magnetic force is at its greatest at zero vertical distance. This illustrates the problem of the known structure that was mentioned earlier: if an external force, such as that caused by a careless user for example, presses the parts of the acoustic transducer too close to each other, they may not be able to return to the nominal design point 502 even if the elastic forces caused by the structural parts of the electronic device try to bring them there. Said elastic forces may simply be too weak to overcome the strong attracting magnetic force at zero (or some other very short) distance.

Graph 503, which is shown as the dashed line in FIG. 5, corresponds to the acoustic transducer structure shown in FIGS. 3 and 4. In this case the zero point of the vertical separation is where the lower part 302 of the acoustic transducer would be so deep inside the upper part 301 that either the second permanent magnet 304 or the coil 308 or both would touch the first permanent magnet 303. Although the nominal design point 502 for graph 503 is shown to coincide with that of graph 501, this is for illustrative comparison only and does not mean that the vertical separations corresponding to the nominal design point should occur at equal vertical separation in all cases.

Graph 503 shows that the structure shown in FIGS. 3 and 4 has a spontaneous tendency to seek balance at the nominal design point 502. If the vertical separation is smaller, the repelling static magnetic force component prevails and tries to push the upper and lower parts 301 and 302 further away from each other, towards the nominal design point 502. If the vertical separation is larger, the attracting static magnetic force component prevails and tries to draw the upper and lower parts 301 and 302 closer together, again towards the nominal design point 502. There may be another balance point at a larger vertical separation, i.e. at the location where graph 503 crosses the horizontal axis again, but that is typically at such large distances that the structures of the electronic device prevent from reaching it at any circumstances.

It is advantageous to design the acoustic transducer and its attachment to the electronic device so that with no current flowing through the coil the vertical separation between the upper and lower parts is at or near the nominal design point 502. This is because the resultant static magnetic force has its smallest absolute values near the nominal design point 502, so already a relatively small dynamic magnetic force created by a current flowing through the coil is enough to cause a relative movement of the upper and lower parts (i.e. the dynamic magnetic force does not need to fight against any large static magnetic force). Repeated relative movements like that are, after all, the way in which the acoustic transducer invokes the oscillating modes in the appropriate structural part of the electronic device, and consequently the emission of acoustic signals. It is advantageous if small currents are sufficient, because this translates into relatively low consumption of electric power. For the same reason it is advantageous to design the structural parts of the electronic device so that the resultant of the static elastic forces they pose is also zero when the acoustic transducer is at its nominal design point 502.

As was pointed out above, the attracting static magnetic force component arises essentially from that part of the magnetic field the field lines of which are confined to the magnetic material of the upper and lower covers 106 and 107. The relative strength of the attracting static magnetic force component depends on the extent to which the edges of the upper and lower covers 306 and 307 coincide (see arrows 404, 405, and 406 in FIG. 4). The location of the nominal design point 502, i.e. the vertical separation at which the edges of the upper and lower covers 306 and 307 coincide just appropriately so that the attracting and repelling static magnetic force components are equal, can be found through simulation and experimenting for each practical implementation of the principle shown in FIGS. 3 and 4.

It is possible to provide an alternative embodiment, in which the resultant static magnetic force never becomes attracting but follows graph 504 in FIG. 5. This kind of an embodiment can be constructed by dimensioning the cover edges and the gap accordingly, for example through simulation and/or experimenting. This kind of an "always repel" embodiment may involve the advantage that the resultant static magnetic force only changes relatively slowly as a function of distance, as shown schematically by graph 504 in FIG. 5. Static mechanical forces produced by the structural parts of the electronic device can be used to suitably balance the structure and to keep the constantly repelling force from moving the upper and lower parts of the acoustic transducer further from each other than is practical.

FIGS. 3 and 4 are to be considered as schematic characterizations of various parts of the acoustic transducer, without taking any exact position on the actual practical implementation. In general it may be said that most preferably the upper cover 306 has a U-formed (or, taken the orientation shown in the drawings, inverted-U-formed) cross section. The first permanent magnet 303 is located inside the loop of the U. In said U-formed cross section, ends of the arms of the U comprise inwards protruding extensions 403. The inner extremities of these extensions 403 define that edge of the upper cover 306 that is of importance when the extent of coinciding with the edge of the lower cover is considered. The lower cover 307 has a plate-formed cross section, with an outer edge of the plate defining the corresponding edge of the lower cover 307. The second permanent magnet 304 is on that side of the plate that faces the inside of the U-formed cross section of the upper cover 306.

Some possible, mutually alternative practical implementations are described next with reference to FIGS. 6 to 12. These are all cross sections along a plane that includes the axis line 305 shown in FIGS. 3 and 4. Here it may be again reminded that although the drawings suggest cylindrical symmetry, this is not a requirement but just an example. Other forms, like polygonal forms with various numbers of corners, are possible.

Figure 6:
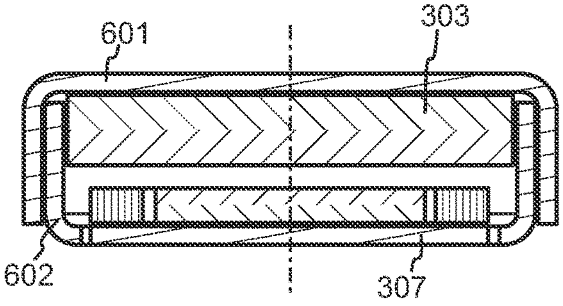
FIG. 6 illustrates an acoustic transducer according to an embodiment.

FIG. 6 illustrates an acoustic transducer in which the upper cover comprises a first cup part 601 and a second cup part 602. Each of these has a skirt portion and an end portion, so that in the respective U-formed cross sections the arms of the U represent the skirt portion and the bottom of the U represents the end portion. The second cup part 602 is in an inverted position with respect to the first cup part 601. In FIG. 6 this is shown so that the cross section of the second cup part 602 is an actual U, while the cross section of the first cup part 601 is an inverted U. The skirt portions of the first and second cup parts 601 and 602 are inside each other for a majority of their length; to be exact, in the embodiment of FIG. 6 the skirt portion of the second cup part 602 is inside that of the first cup part 601. The end portion of the second cup part 602 has an opening, the edge of which defines the edge of the upper cover that has been described above with reference to the schematic FIGS. 3 and 4.

Figure 7:
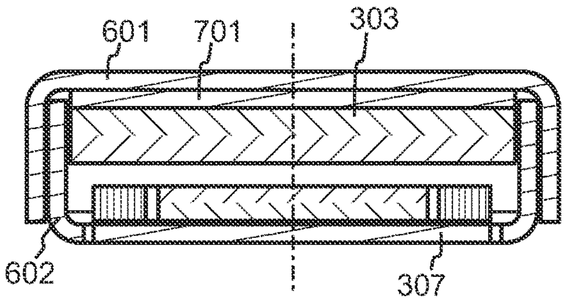
FIG. 7 illustrates an acoustic transducer according to an embodiment.

FIG. 7 illustrates an acoustic transducer that is otherwise similar to that in FIG. 6 but the upper part comprises a sheet 701 of magnetic material stacked between the first permanent magnet 303 and the end portion of the first cup part 601.

Figure 8:
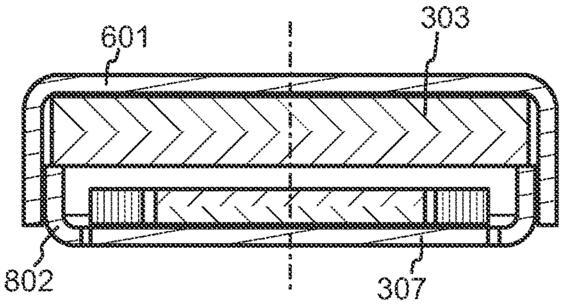
FIG. 8 illustrates an acoustic transducer according to an embodiment.

FIG. 8 illustrates an acoustic transducer in which the skirt portion of the second cup part 802 is significantly shorter than that of the first cup part 601. As a consequence, the skirt portions of the first and second cup parts 601 and 802 are only partially inside each other. To be exact, the whole skirt portion of the second cup part 802 is inside a part of the skirt portion of the first cup part 601. The acoustic transducer of FIG. 9 is otherwise similar to that of FIG. 8, but in FIG. 9 the upper part comprises a sheet 701 of magnetic material stacked between the first permanent magnet 303 and the end portion of the first cup part 601.

Figure 9:
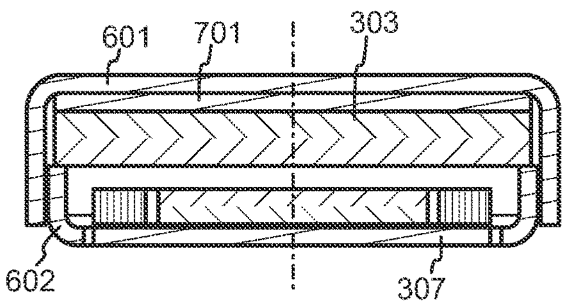
FIG. 9 illustrates an acoustic transducer according to an embodiment.

The acoustic transducers of FIGS. 6 and 7 on one hand and those of FIGS. 8 and 9 on the other hand have a difference regarding the relative dimensions of the first permanent magnet 303 and the second cup part 602 or 802. In the embodiments of FIGS. 6 and 7 the first permanent magnet 303 is inside the skirt portions of both the first and second cup parts 601 and 602. In the embodiments of FIGS. 8 and 9, where the length of the skirt portion of the first cup part 601 is larger than that of the skirt portion of the second cup part 802, the first permanent magnet 303 is only inside the skirt portion of the first cup part 601. Consequently, in the embodiments of FIGS. 8 and 9, the first permanent magnet 303 and the second cup part 802 are actually stacked inside the skirt portion of the first cup part 601.

The embodiments shown in FIGS. 6 to 9 have certain differences regarding the order in which their upper parts may be assembled during manufacturing. In the embodiments of FIGS. 8 and 9 it is relatively easy to attach the first permanent magnet 303 to the first cup part 601 (possibly with an additional sheet 701 of magnetic material stacked therebetween), and only thereafter add the second cup part 802 and attach the skirt portions of the first and second cup portions together. If the embodiments of FIGS. 6 and 7 were to be assembled in similar order, the first permanent magnet 303 would need to be aligned very carefully with the first cup part 601 when attaching, so that the skirt portion of the second cup part 602 could slide around it thereafter. It is possible that a more advantageous order of assembling the embodiments of FIGS. 6 and 7 would be to first attach the first permanent magnet 303 (and possibly also the additional sheet 701 of magnetic material) to the second cup part 602, and to only thereafter attach this entity to the first cup part 601.

Figure 10:
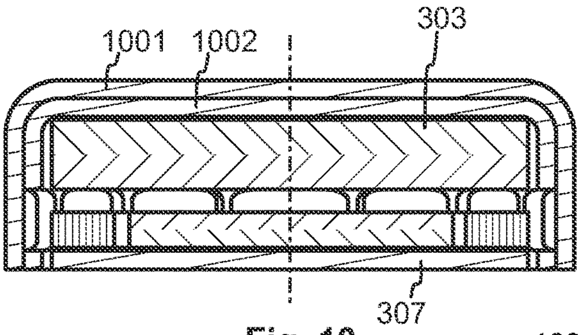
FIG. 10 illustrates an acoustic transducer according to an embodiment.
Figure 11:
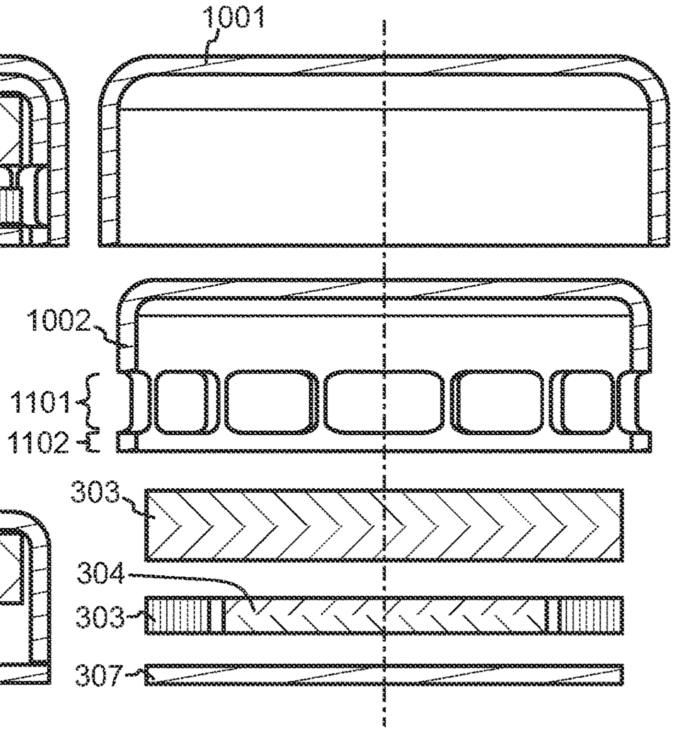
FIG. 11 illustrates the acoustic transducer of FIG. 10 in exploded view.

FIGS. 10 and 11 illustrate an acoustic transducer according to a further alternative embodiment. FIG. 10 shows the acoustic transducer in assembled configuration and FIG. 11 shows its parts partially separated from each other. Also in this embodiment the upper cover comprises a first cup part 1001 and a second cup part 1002, each having a skirt portion and an end portion. In this embodiment the second cup part 1002 is in a similarly oriented position with the first cup part 1001 (both seen as inverted U's in cross section) and inside it. The skirt portion of the second cup part 1002 comprises a perforated zone 1101 of the skirt portion at an intermediate longitudinal level thereof. Additionally it comprises a solid zone 1102 at that end of the skirt portion that is opposite to the end portion of the second cup part 1002.

The solid zone 1102 defines the edge of the upper cover that has been described above with reference to the schematic FIGS. 3 and 4. This is a result of the perforated zone 1101 having such a large proportion of the solid material removed that a significant majority of those magnetic field lines that were otherwise confined to the magnetic material of the second cup part 1002 must pass the perforated zone 1101 through the skirt portion of the first cup part 1001.

The embodiment shown in FIGS. 10 and 11 has the advantage that all manufacturing stages of the upper cover involving the shaping and attaching together of magnetic material, apart from the first permanent magnet 303, can be completed before attaching the first permanent magnet 303.

Figure 12:
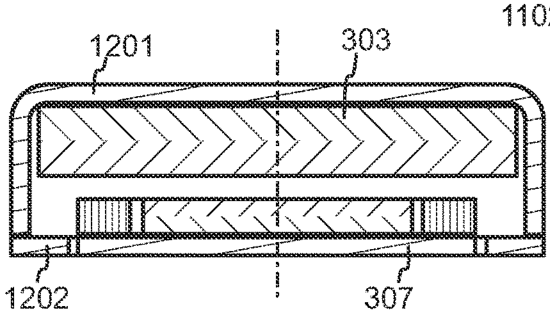
FIG. 12 illustrates an acoustic transducer according to an embodiment.

FIG. 12 illustrates an acoustic transducer according to a further alternative embodiment. In FIG. 12 the upper cover comprises a first cup part 1201 having a skirt portion closed at one (upper) end by an end portion and open at the other (lower) end. As such, the first cup part 1201 resembles quite closely the first cup parts in the other embodiments described above. However, in the embodiment of FIG. 12 there is no second cup part. Instead, the upper cover comprises a washer part 1202 that has an outer rim and an inner rim. The inner rim defines an opening that is smaller than the inner dimension of the skirt portion in the first cup part 1201. The washer part 1202 is attached to the open end of the skirt portion in the first cup part 1201, concentrically with the first cup part 1201. Thus, the inner rim of the washer part 1202 also defines the edge of the upper cover that has been described above with reference to the schematic FIGS. 3 and 4.

If needed, the embodiment shown in FIG. 12 can be augmented with an additional sheet of magnetic material between the end portion of the first cup part 1201 and the first permanent magnet 303. The embodiment shown in FIG. 12 involves the additional advantage that because the important edge of the upper cover is solely defined by the washer part 1202, the thickness, shape, and other characteristics of the edge can be selected more freely than in many other embodiments.

Numerous variations could be made to the embodiments shown in FIGS. 6 to 12. For example, in embodiments like those of FIGS. 6 to 9 it would be possible to choose the inner diameters of the skirt portions the other way around, so that the skirt portion of the first cup part would go inside the skirt portion of the second cup part. Also, it is not necessary to make the upper cover of two separate parts even in the first place. Even if one wants the first permanent magnet to fill the space available to it maximally, it would be possible to first make a cup-formed upper cover with a straight skirt portion, attach the first permanent magnet in place, and only thereafter bend the free edge of the skirt portion inwards to produce the edge of the upper cover that has been described above with reference to the schematic FIGS. 3 and 4.

In the embodiments of FIGS. 6 to 12 the various cup parts can be made of e.g. thin sheets of magnetic metal by stamping or pressing. The thinner the metallic sheet, the easier it is to press neatly and accurately into a cup-formed shape. However, as the upper and lower covers have the purpose of confining the field lines of the magnetic fields involved, it is not advantageous to make them arbitrarily thin: a thin material layer is less effective in confining magnetic field lines than a thick one. For example, in the embodiments of FIGS. 7 and 9 the purpose of the additional sheet 701 of magnetic material is to add material thickness, consequently improving the capability of the topmost portion of the upper cover to confine magnetic field lines. Aiming at maximal total thickness of magnetic material also advocates embodiments like those in FIGS. 6, 7, 10, and 11, where the skirt portions of two cup parts are inside each other for a majority of the length of them both. As an example, in embodiments like those of FIGS. 6 to 12 the wall thickness of any single piece of magnetic material made by stamping or pressing from a metal sheet may be in the order of 0.2 to 1.0 mm, preferably between 0.5 and 0.75 mm these ends included.

Metal sheet as a starting point and pressing or stamping as a manufacturing method are not the only possible choices. It is possible to manufacture the cup parts, or indeed any mechanical component of the upper and lower parts of the acoustic transducer, for example by milling from a blank or by additive manufacturing methods such as 3D printing.

The vertical separation between the first permanent magnet and the topmost part of either the second permanent magnet or the coil (or both, if they are on the same level) may be in the order of some hundreds of micrometers, for example 400 micrometers at the nominal design point referred to above in the description of FIG. 5. The relative vertical movements of the upper and lower parts in operation, i.e. when oscillations at acoustic frequencies are produced, may be much smaller than that, in the order of only some micrometers or, at the lowest desired frequencies, in the order of some tens of micrometers. The shortest distance between the edges of the upper and lower parts at the gap 309 (see FIG. 3) is advantageously in the order of some tens or some hundreds of micrometers, for example between 50 micrometers and 500 micrometers. A small gap is advantageous in terms of making the attracting static magnetic force component contribute effectively to the desired way of operation, but the achievable accuracy of manufacturing methods may set a lower limit to how small gaps may be aimed at.

Concerning the intended operation of the acoustic transducer, it is advantageous to allow the upper and lower parts move relative to each other quite freely in the vertical direction (the direction of the axis line 305) while preventing them from moving in the horizontal direction. Advantageously, the acoustic transducer may comprise a support member configured to resist relative movement of the upper and lower parts 301 and 302 in directions perpendicular to said axis line 305 while simultaneously allowing relative movement of the upper and lower parts 301 and 302 in the direction of the axis line 305.

Figure 13:
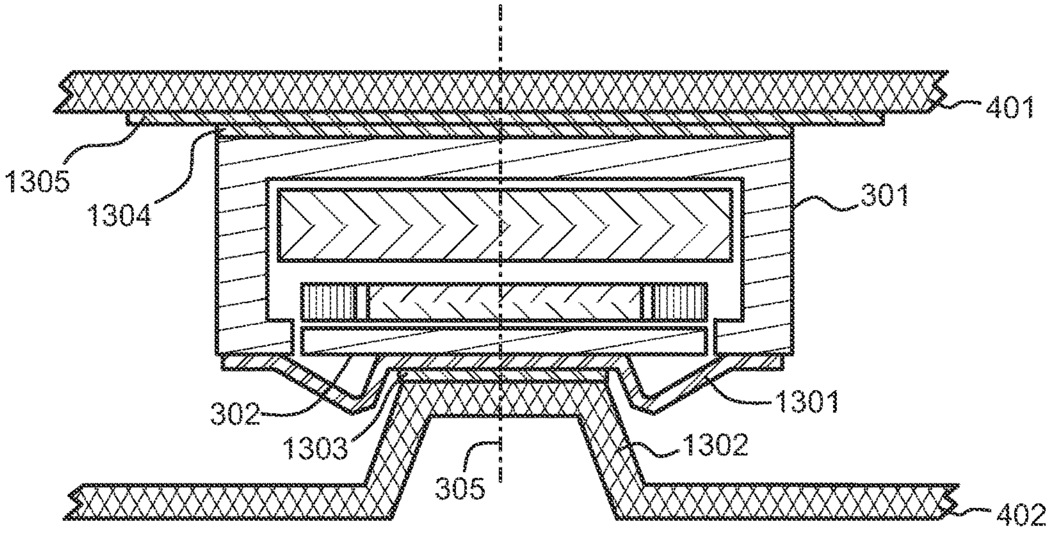
FIG. 13 illustrates an acoustic transducer according to an embodiment.

FIG. 13 shows schematically an arrangement for producing sound. It comprises an electronic device with a first structural part 401 and a second structural part 402, as well as an acoustic transducer of a kind that has been described above. The schematic-type graphical representation of FIG. 4 is used for the acoustic transducer to underline that this example embodiment is not limited to any particular actual implementation of the acoustic transducer. The upper part 301 of the acoustic transducer is attached to the first structural part 401 and the lower part 302 of the acoustic transducer is attached to the second structural part 402 of the electronic device. Although not shown in FIG. 13, the electronic device is assumed to comprise an electric circuit configured to feed electric signals into at least one coil of the acoustic transducer.

A support member 1301 is schematically shown in FIG. 13. As explained above, the support member 1301 is configured to resist relative movement of the upper and lower parts 301 and 302 in directions perpendicular to the axis line 305 while simultaneously allowing relative movement of the upper and lower parts 301 and 302 in the direction of the axis line 305. In this embodiment the support member 1301 is a part of the arrangement that attaches the lower part 302 to the second structural part 402 of the electronic device. More exactly, in this embodiment the support member 1301 is stacked between the lower part 302 and the second structural part 402.

Figure 14:
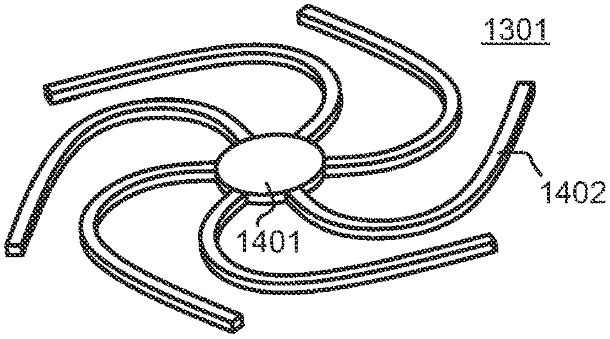
FIG. 14 illustrates an example of an elastic support member.

FIG. 14 shows an example of a support member 1301. According to this embodiment the support member 1301 comprises a multibranch spiral spring. If used in the way shown in FIG. 13, a center portion 1401 of the multibranch spiral spring 1301 is attached to the lower part 302 and extremities 1402 of said multibranch spiral spring 1301 are attached to the upper part 301. The branches of the spiral spring 1301 are assumed to be so stiff in the radial direction that they effectively prevent the unwanted relative movement of the upper and lower parts 301 and 302 in directions perpendicular to the axis line 305. At the same time the branches of the spiral spring 1301 are so ductile in the transverse direction that they offer little resistance to the relative movement of the upper and lower parts 301 and 302 in the direction of the axis line 305. In place of a multibranch spiral spring it is possible to use a circular, cross-formed, or star-formed leaf spring as a support member.

Figure 15:
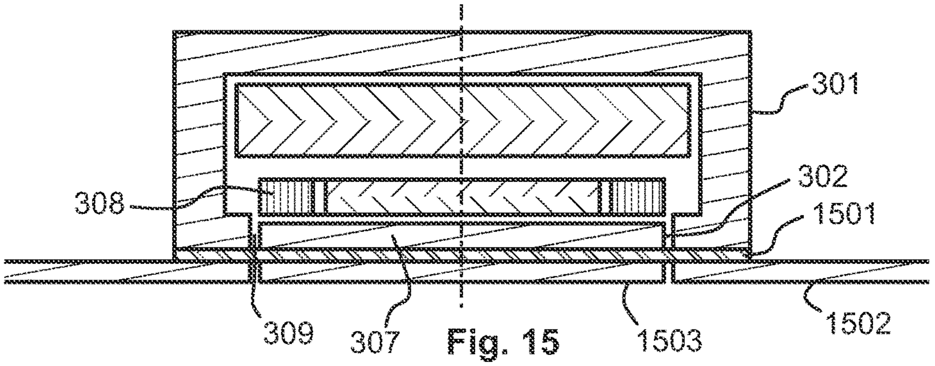
FIG. 15 illustrates an acoustic transducer according to an embodiment.

FIG. 15 shows an alternative embodiment in which the support member comprises a foil 1501 attached to the upper and lower parts 301 and 302 and bridging the gap 309. The foil 1501 is assumed to exhibit very little stretch under forces parallel to the foil itself, while it may bend relatively easily under forces perpendicular thereto. Although, at least in the mathematically exact meaning, any relative vertical displacing of the upper and lower parts 301 and 302 requires also the foil 1501 to stretch, the magnitude of the required vertical displacement may be in the order of micrometers while the width of the gap 309 may be hundreds of micrometers. The relative magnitudes of these dimensions mean that the amount of stretch that the foil 1501 must exhibit to allow such vertical displacements is extremely small. FIG. 15 also shows how in this exemplary embodiment the first structural part 1502 and the second structural part 1503 may be located (or at least have some portions extending to) below the foil 1501.

According to one exemplary embodiment at least a part of the foil 1501 may constitute a flexible printed circuit for conducting electric signals to at least one coil 308 in the acoustic transducer. In such a case at least part of the foil 1501 would extend further from the acoustic transducer, and/or one or more parts of the structure shown in FIG. 15 would have the necessary conductive vias for conducting the electric signals through such parts.

The structural parts of the electronic device must be formed so that they do not unnecessarily interfere with the intended relative vertical movements of the upper and lower parts of the acoustic transducer. In the embodiment of FIG. 13 this has been accomplished by making the second structural part 402 comprise an elevated portion 1302, to which the acoustic transducer is attached with an attachment layer 1303 that may be for example glue or tape. The attachment layer 1303 may also comprise other forms of attachment, like ultrasonic welding.

In FIG. 13, just like in FIG. 4 earlier, one possibility is that the first structural part 401 comprises a visible outer surface of the electronic device, such as a display of the electronic device. The second structural part 402 may comprise for example a part of a structural support frame of the electronic device.

An acoustic transducer, the purpose of which is to convert vertical movements of its upper part into oscillating modes of a structural part of an electronic device in order to produce sound, has in all cases its upper part attached to such a structural part. How such an attachment is made may have a significant effect on how effectively and at which subjective quality level the sound can be produced. This is true in general for all acoustic transducers, also those shown in FIGS. 1 and 2 and described in the background section above. The oscillating modes induced in the structural part of the electronic device may be quite complicated, including a number of two-dimensional modes with a plurality of wavelengths in both dimensions. A basic trend is that the higher the frequency of the sound to be produced, the more complicated oscillating modes may take part in producing it.

In embodiments such as those described above with reference to FIGS. 1-4, 6-13, and 15, a characteristic lateral dimension of the upper surface of the upper part may be something like 15-20 millimeters. If the acoustic transducer exhibits cylindrical symmetry, the upper surface of the upper part is circular so its characteristic lateral dimension is its diameter. The upper part may be relatively stiff due to the tightly stacked configuration of the end portion of a cup part, possible additional sheet of magnetic material, and a first permanent magnet. If it has a rigid attachment to the first structural part of the electronic device throughout its upper surface, this means that a corresponding portion of the first structural part of the electronic device will remain completely stiff, excluding the occurrence of any such oscillating modes where that circular portion could oscillate otherwise than vertically back and forth as a whole. Under certain circumstances, for example if the display (or other first structural part) of the electronic device is small, this may cause suboptimal audio quality.

It would be advantageous to provide an arrangement for producing sound without the drawback above. The arrangement should comprise an electronic device with first and second structural parts, and an acoustic transducer with its upper part attached to the first structural part and its lower part attached to the second structural part. As a part of the electronic device an electronic circuit should be provided, the electronic circuit being configured to feed electric signals into at least one coil of the acoustic transducer.

Figure 16:
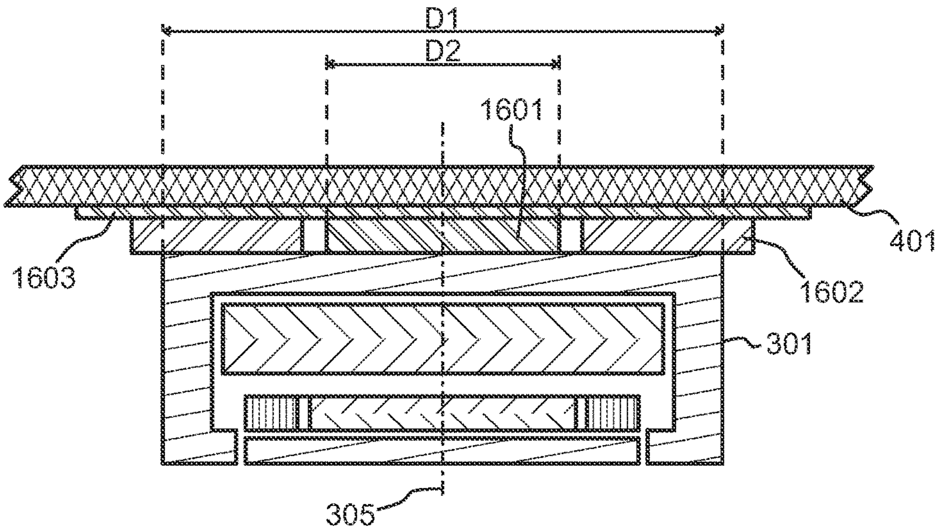
FIG. 16 illustrates an acoustic transducer according to an embodiment.

According to an aspect, the advantageous objectives placed above are achieved following a principle that is schematically illustrated in FIG. 16. Here it should be noted that although an acoustic transducer of the kind described earlier with reference to FIGS. 3 and 4 is used as an example, the principle shown in FIG. 16 is also applicable for use with acoustic transducers of the kind described earlier with reference to FIGS. 1 and 2.

In the principle of FIG. 16 the upper part 301 of the acoustic transducer has a first lateral dimension D1 on that side at which it is attached to the first structural part 401 of the electronic device. The arrangement comprises an essentially non-elastic first attachment member 1601 between the upper part 301 and the first structural part 401, for conveying movements of said upper part 301 in the direction of the axis line 305 into said first structural part 401. The first attachment member 1601 has a second lateral dimension D2 that is smaller than said first lateral dimension D1.

The first attachment member 1601 may be a separate part, like a disc of metal or hard plastic, placed between the upper part 301 and the first structural part 401. Alternatively it may be an integral portion of the upper part 301, for example if the cup-formed outer part of the upper part 301 is machined from a solid blank so that an elevated portion has been left at its center.

The effect of using a somewhat smaller attachment member 1601 between the upper part 301 and the first structural part 401 is that only a portion with a characteristic lateral dimension D2 of the first structural part 401 remains rigid. All other portions of the first structural part 401 may take part in any oscillating modes that are to produce the desired sound.

Figure 17:
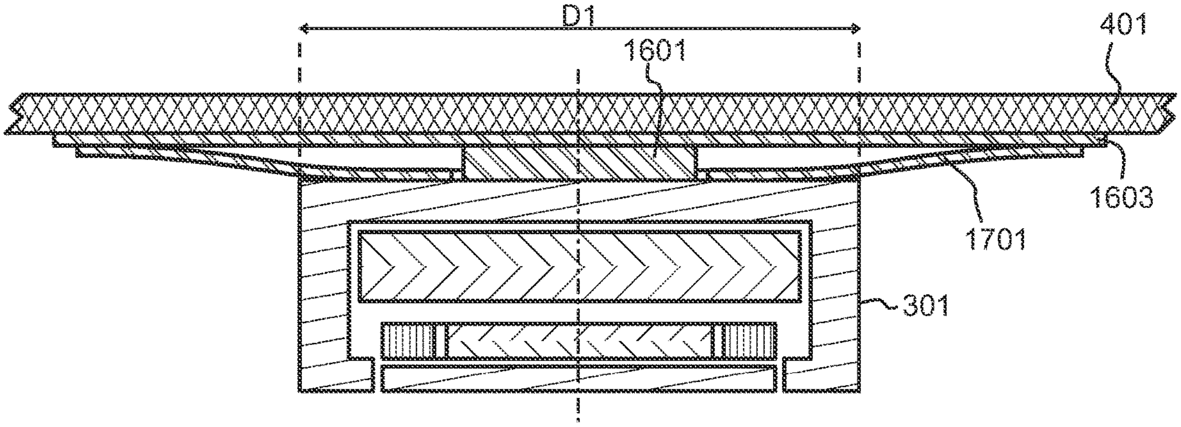
FIG. 17 illustrates an acoustic transducer according to an embodiment.

In the embodiment shown in FIG. 16 the arrangement comprises an essentially elastic second attachment member 1602 between those portions of the upper part 301 and the first structural part 301 that are not covered by the first attachment part 1601. The second attachment member 1602 is provided to stabilize the upper part 301 against tilting with respect to the first structural part 401. FIG. 17 shows an alternative embodiment, in which a different kind of a second attachment member 1701 is provided for the same purpose. In FIG. 16 the second support part 1602 consists of elastically deformable cushioning material, while in FIG. 17 the second support part 1701 comprises spring branches that extend further on the first structural part 401 than the characteristic lateral dimension D1 of the upper part 301.

A further, optional feature shown in FIGS. 16 and 17 is a support sheet 1603 placed between the upper part 301 and the first structural part 401 of the electronic device. Although the support sheet 1603 is shown here in use together with the first and second attachment members, it could be used also in embodiments without them (see support sheet 1305 in FIG. 13, for example). The purpose of a support sheet is to match local elastic properties of the first structural part 401 to movements conveyed thereto by the upper part 301. In particular if a first attachment member 1601 is used, it may happen that the first structural part 401 could become susceptible to excessive point-like loads, so the support sheet 1603 could be used to ensure its sufficient structural strength.

Figure 18:
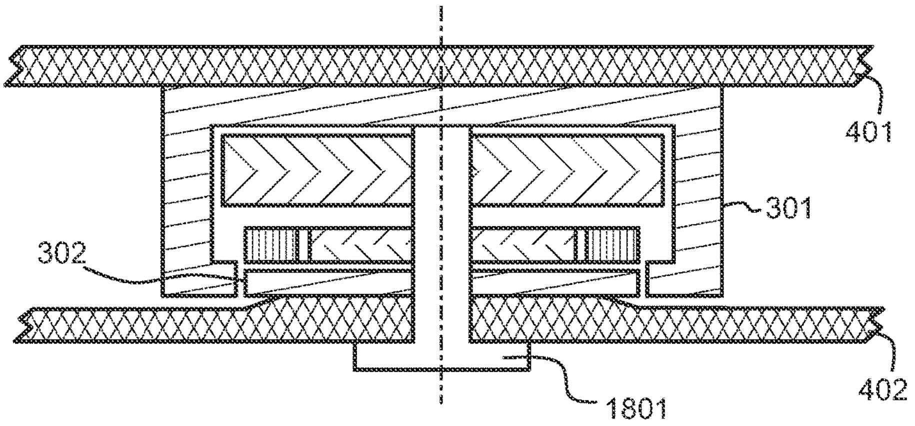
FIG. 18 illustrates an acoustic transducer according to an embodiment.

FIG. 18 illustrates an alternative embodiment in which a support strut 1801 extends along the central axis of the acoustic transducer, through its lower part 302 up to the inner surface of the upper cover in the upper part 301.

In most embodiments described above the upper cover has a U-formed cross section, although—as already pointed out earlier—calling it the "upper" cover only refers to the orientation that is shown in the drawings. It is possible to turn any of the acoustic transducers described above upside down, so that the cover with the U-formed cross section would be conceived as the "lower" cover.

Figure 19:
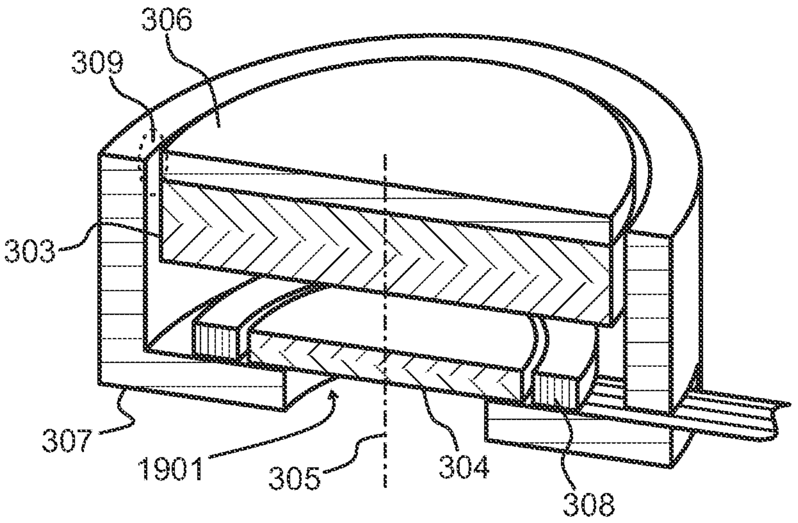
FIG. 19 illustrates an acoustic transducer according to an embodiment.
Figure 20:
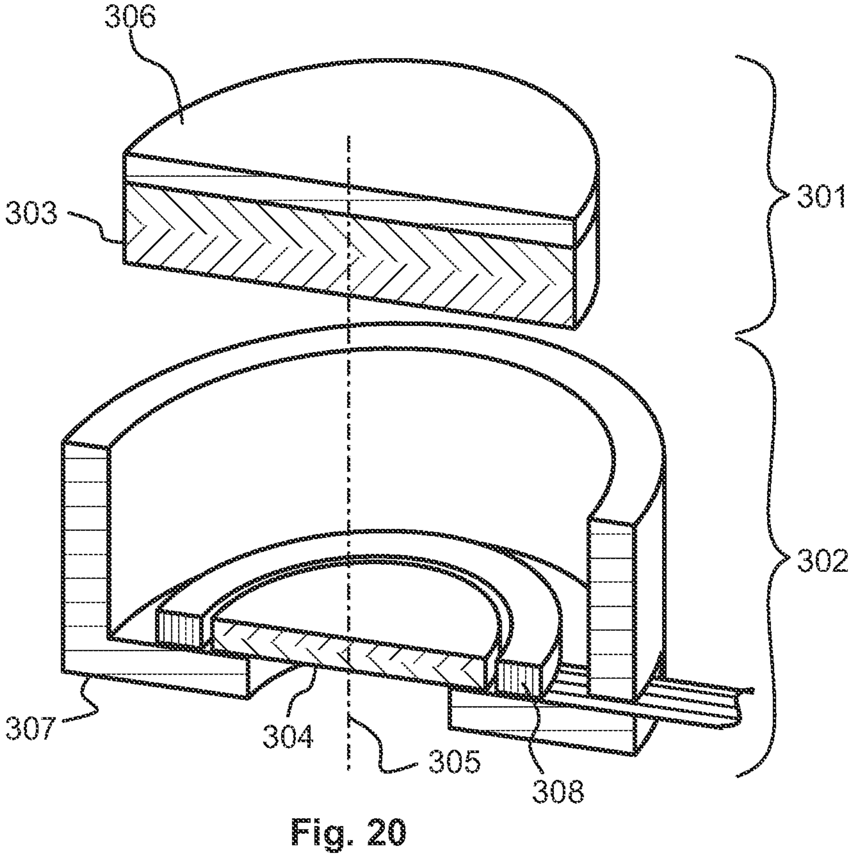
FIG. 20 illustrates the acoustic transducer of FIG. 19 in a partially exploded view.

FIG. 19 illustrates an acoustic transducer according to an embodiment. FIG. 20 illustrates the same acoustic transducer in a partially exploded view. The acoustic transducer according to this embodiment comprises an upper part 301 and a lower part 302. A first permanent magnet 303 is located in the upper part 301, and a second permanent magnet 304 is located in the lower part 302. Similarly named magnetic poles of the first and second permanent magnets 303 and 304 face each other in the direction of the axis line 305. There is an upper cover 306 in the upper part 301 and a lower cover 307 in the lower part 302. The upper and lower covers 306 and 307 comprise magnetic material and together define an enclosure around the first and second permanent magnets 303 and 304. A coil 308 is located in this enclosure, here in the lower part 302. The coil 308 is configured to create, under influence of an electric current flowing therethrough, dynamic magnetic forces in the direction of the axis line 305.

A separating gap 309 between the edges of the upper cover 306 and lower cover 307 is directed essentially in the direction of the axis line 305. It allows a relative movement of the edges of the lower cover 307 and the upper cover 306 in the direction of the axis line 305 between different positions. In particular, such positions differ in the extent to which the edges of the upper cover 306 and lower cover 307 coincide in the direction perpendicular to the axis line 305.

In the embodiment of FIGS. 19 and 20 the lower cover 307 has a U-formed cross section, with the second permanent magnet 304 located inside the loop of the U. In this very simple embodiment, the ends of the arms of the U do not comprise any inwards protruding extensions that would have inner extremities that would define the edge of the lower cover 307. Such inwards protruding extensions are not even required by the definition above, according to which the possible relative positions of the upper and lower cover differ in the extent to which the edges of the covers coincide in the perpendicular direction. Said definition is met here so that if the upper part 301 moves downwards from the position shown in FIG. 19, a larger proportion of the edge of the upper cover 306 faces the inside of the lower 307 cover directly across the gap 309. Correspondingly, if the upper part 301 of FIG. 19 moves upwards, it moves out of the "cup" formed by the lower cover 307, so that a smaller proportion of the edge of the upper cover 306 faces the inside of the lower 307 cover directly across the gap 309.

It may be noted that similarly, although the embodiments shown in FIGS. 3-4, 6-13, and 15-18 have the inwards protruding extensions at the ends of the arms of the U-formed cross section of the upper cover, also in those embodiments the structure could be slightly simplified to resemble that of the U-formed lower cover in FIGS. 19 and 20. The inwards protruding extensions may help in achieving the desired balancing effect on the properties of the acoustic transducer, but they are not necessary for implementing the operating principle described in this text.

Conversely, it is possible to add inwards protruding extensions to the ends of the arms of the U-formed cross section of the lower cover 307 of FIGS. 19 and 20. As an example, any of those structural solutions can be used that were introduced earlier in FIGS. 6-12 concerning the U-formed cross section of what was there the upper cover.

One additional feature that is shown in FIGS. 19 and 20 is the opening 1901 at the center of the lower cover 307. Similar openings located centrally around the axis line 305 may be used in any of the upper and lower covers in all embodiments. Such openings may be used to create advantageous effects in directing the magnetic field lines of the permanent magnets in an optimal way.

Any features that were described earlier that are not directly dependent on which of the upper and lower covers has a U-formed cross section can be applied as such in the embodiment shown in FIGS. 19 and 20. Examples of such features include but are not limited to the support members 1301 and 1501, the attachment techniques shown in FIGS. 13 and 16-18, and even the attachment technique of FIG. 15 if one just places the structural part shown as 1502 on top (with reference to the orientation shown in the drawings) of the acoustic transducer of FIGS. 19 and 20.

An interesting additional field of embodiments involves building a vibration device for other purposes than emitting sound, using a device that above was described as an acoustic transducer. As a first example, the vibration device could be used to produce vibrating alerts, resembling the way in which many portable communicating devices use electric motors connected to an off-center weight. For this purpose, the lower part of the device could be attached to a structural part of the electronic device just like in the embodiments described above. Instead of attaching the upper part to the inside of a display or other structural part, the upper part of the device could be left free, possibly with some additional weight attached thereto on order to achieve one or more suitable mechanical resonance frequencies.

As another example, the vibration device could be used to produce haptic effects as a part of a user interface that involves touching. It has been found that the human sense of touch can be deliberately mislead, for example so that the person gets the sensory feeling of pressing a key, even if in reality he or she only receives haptic feedback in the form of a suitably designed short-term waveform that involves relatively high-frequency oscillations. For this purpose the attachment to the structural parts of the electronic device could resemble those described above with reference to the various drawings, but with the elastic properties of the parts and the electronic signals led to the coil (s) designed for optimization of the haptic effect.

It is obvious to a person skilled in the art that with the advancement of technology, the basic idea of the invention may be implemented in various ways. The invention and its embodiments are thus not limited to the examples described above, instead they may vary within the scope of the claims. As an example, even if only one coil has been described in the embodiments, there could be two or more coils, for example so that one coil is around the second permanent magnet like in the described embodiments, but another coil is around the first permanent magnet. Additionally, it is not a requirement that the coil (s) is always around the permanent magnet (s), although such an arrangement helps to keep the vertical dimension of the structure small. At least one coil could be placed in the space between the permanent magnets. As a yet further alternative, at least one of the permanent magnets could be ring-formed with a coil placed inside the ring.

The invention claimed is:

1. An acoustic transducer for converting electric signals into mechanical vibrations on acoustic frequencies, the acoustic transducer comprising:

an upper part and a lower part;

a first permanent magnet located in the upper part and a second permanent magnet located in the lower part, with same named magnetic poles of the first and second permanent magnets facing each other in the direction of an axis line;

an upper cover in the upper part and a lower cover in the lower part, said upper and lower covers comprising magnetic material and together defining an enclosure around the first and second permanent magnets; and at least one coil located in said enclosure and configured to create, under influence of an electric current flowing through said coil, dynamic magnetic forces in the direction of said axis line;

wherein a separating gap between edges of said upper cover and lower cover is directed essentially in the direction of said axis line, allowing a relative movement of the edges of said lower cover and said upper cover in the direction of said axis line between different positions, said positions differing in the extent to which said edges of said upper cover and lower cover coincide in the direction perpendicular to said axis line;

wherein said upper cover has a U-formed cross section, with said first permanent magnet located inside the loop of the U-formed cross section;

wherein said lower cover has a plate-formed cross section, with an outer edge of the plate defining said edge of the lower cover; and wherein said second permanent magnet is on that side of the plate that faces the inside of the U-formed cross section of the upper cover.

2. The acoustic transducer according to claim 1, wherein the cover with the U-formed cross section comprises a first cup part having a skirt portion closed at one end by an end portion and open at the other end, said cover with the U-formed cross section comprises a washer part with an outer rim and an inner rim, of which said inner rim defines an opening that is smaller than the inner dimension of said skirt portion, and said washer part is attached to the open end of the skirt portion, concentrically with said first cup part, so that the inner rim of the washer part defines said edge of the cover with the U-formed cross section.

3. The acoustic transducer according to claim 1, comprising a support member configured to resist relative movement of said upper and lower parts in directions perpendicular to said axis line while simultaneously allowing relative movement of said upper and lower parts in the direction of said axis line.

4. The acoustic transducer according to claim 3, wherein said support member comprises a multi-branch spiral spring, with a center portion of said multi-branch spiral spring attached to one of the upper and lower parts and extremities of said multi-branch spiral spring attached to the other part.

5. The acoustic transducer according to claim 3, wherein said support member comprises a foil attached to said upper and lower parts and bridging said separating gap.

6. The acoustic transducer according to claim 5, wherein at least a part of said foil constitutes a flexible printed circuit for conducting electric signals to said at least one coil.

7. An acoustic transducer for converting electric signals into mechanical vibrations on acoustic frequencies, the acoustic transducer comprising:

an upper part and a lower part;

a first permanent magnet located in the upper part and a second permanent magnet located in the lower part, with magnetic poles of the same name of the first and second permanent magnets facing each other in the direction of an axis line;

an upper cover in the upper part and a lower cover in the lower part, said upper and lower covers comprising magnetic material and together defining an enclosure around the first and second permanent magnets; and at least one coil located in said enclosure and configured to create, under influence of an electric current flowing through said coil, dynamic magnetic forces in the direction of said axis line;

wherein a separating gap between edges of said upper cover and lower cover is directed essentially in the direction of said axis line, allowing a relative movement of the edges of said lower cover and said upper cover in the direction of said axis line between different positions, said positions differing in the extent to which said edges of said upper cover and lower cover coincide in the directiokn perpendicular to said axis line;

wherein said lower cover has a U-formed cross section, with said second permanent magnet located inside the loop of the U-formed cross section;

wherein said upper cover has a plate-formed cross section, with an outer edge of the plate defining said edge of the upper cover; and wherein said first permanent magnet is on that side of the plate that faces the inside of the U-formed cross section of the lower cover.

8. The acoustic transducer according to claim 7, wherein in said U-formed cross section, ends of the arms of the U-formed cross section comprise inwards protruding extensions, inner extremities of said extensions defining the edge of the respective cover.

9. The acoustic transducer according to claim 8, wherein the cover with the U-formed cross section comprises a first cup part and a second cup part, each having a skirt portion and an end portion, said second cup part is in an inverted position with respect to the first cup part, said skirt portions of said first and second cup parts are at least partially inside each other, and the end portion of said second cup part has an opening, the edge of which defines said edge of the cover with the U-formed cross section.

10. The acoustic transducer according to claim 9, wherein:

said skirt portions of said first and second cup parts are inside each other for a majority of the length of the skirt portions of both said first and said second cup parts, and the respective permanent magnet is inside the skirt portions of both said first and said second cup parts.

11. The acoustic transducer according to claim 9, wherein:

the length of the skirt portion of said first cup part is larger than the length of the skirt portion of said second cup part, the respective permanent magnet is inside the skirt portion of said first cup part, and said respective permanent magnet and said second cup part are stacked inside the skirt portion of said first cup part.

12. The acoustic transducer according to claim 9, wherein a sheet of magnetic material is stacked between said respective permanent magnet and the end portion of the first cup part.

13. The acoustic transducer according to claim 8, wherein the cover with the U-formed cross section comprises a first cup part and a second cup part, each having a skirt portion and an end portion, said second cup part is oriented in a same way as the first cup part and positioned inside said first cup part, the skirt portion of said second cup part comprises a perforated zone of said skirt portion at an intermediate longitudinal level of said skirt portion, and the skirt portion of said second cup part comprises a solid zone at its end opposite to the end portion, which solid zone defines said edge of the cover with the U-formed cross section.

14. An arrangement for producing sound, the arrangement comprising:

an electronic device with first and second structural parts;

at least one acoustic transducer comprising, an upper part and a lower part;

a first permanent magnet located in the upper part and a second permanent magnet located in the lower part, with same named magnetic poles of the first and second permanent magnets facing each other in the direction of an axis line;

an upper cover in the upper part and a lower cover in the lower part, said upper and lower covers comprising magnetic material and together defining an enclosure around the first and second permanent magnets; and at least one coil located in said enclosure and configured to create, under influence of an electric current flowing through said coil, dynamic magnetic forces in the direction of said axis line;

wherein a separating gap between edges of said upper cover and lower cover is directed essentially in the direction of said axis line, allowing a relative movement of the edges of said lower cover and said upper cover in the direction of said axis line between different positions, said positions differing in the extent to which said edges of said upper cover and lower cover coincide in the direction perpendicular to said axis line;

wherein said upper cover has a U-formed cross section, with said first permanent magnet located inside the loop of the U-formed cross section;

wherein said lower cover has a plate-formed cross section, with an outer edge of the plate defining said edge of the lower cover;

wherein said second permanent magnet is on that side of the plate that faces the inside of the U-formed cross section of the upper cover; and wherein the upper part of the acoustic transducer is attached to said first structural part and the lower part of the acoustic transducer is attached to said second structural part of the electronic device; and as part of the electronic device an electric circuit configured to feed electric signals into said at least one coil of the at least one acoustic transducer.

15. The arrangement according to claim 14, wherein said first structural part comprises a visible outer surface of said electronic device, such as a display of said electronic device.

16. The arrangement according to claim 14, wherein said second structural part comprises a part of a structural support frame of the electronic device.

17. The arrangement according to claim 14, wherein the upper part of the acoustic transducer has a first lateral dimension on that side at which the upper part is attached to the first structural part, the arrangement comprises an essentially non-elastic first attachment member between said upper part and said first structural part for conveying movements of said upper part in the direction of said axis line into said first structural part, and said first attachment member has a second lateral dimension that is smaller than said first lateral dimension.

18. The arrangement according to claim 17, wherein the arrangement comprises an essentially elastic second attachment member between those portions of said upper part and said first structural part that are not covered by said first attachment part, for stabilizing said upper part against tilting with respect to said first structural part.

19. The arrangement according to claim 18, wherein said second attachment member comprises at least one of: elastically deformable cushioning material, spring branches extending further on said first structural part than said first lateral dimension of the upper part, wherein the arrangement comprises a support sheet between said upper part and said first structural part for matching local elastic properties of the first structural part to movements conveyed thereto by the upper part.

20. An arrangement for producing sound, the arrangement comprising:

an electronic device with first and second structural parts;

at least one acoustic transducer comprising, an upper part and a lower part;

a first permanent magnet located in the upper part and a second permanent magnet located in the lower part, with same named magnetic poles of the first and second permanent magnets facing each other in the direction of an axis line;

an upper cover in the upper part and a lower cover in the lower part, said upper and lower covers comprising magnetic material and together defining an enclosure around the first and second permanent magnets; and at least one coil located in said enclosure and configured to create, under influence of an electric current flowing through said coil, dynamic magnetic forces in the direction of said axis line;

wherein a separating gap between edges of said upper cover and lower cover is directed essentially in the direction of said axis line, allowing a relative movement of the edges of said lower cover and said upper cover in the direction of said axis line between different positions, said positions differing in the extent to which said edges of said upper cover and lower cover coincide in the direction perpendicular to said axis line;

wherein said lower cover has a U-formed cross section, with said second permanent magnet located inside the loop of the U-formed cross section;

said upper cover has a plate-formed cross section, with an outer edge of the plate defining said edge of the upper cover; and said first permanent magnet is on that side of the plate that faces the inside of the U-formed cross section of the lower cover;

wherein the upper part of the acoustic transducer is attached to said first structural part and the lower part of the acoustic transducer is attached to said second structural part of the electronic device; and as part of the electronic device an electric circuit configured to feed electric signals into said at least one coil of the at least one acoustic transducer.

* * * * *